(12) United States Patent
Tsukagoshi

(10) Patent No.: US 11,722,636 B2
(45) Date of Patent: *Aug. 8, 2023

(54) TRANSMISSION DEVICE, TRANSMISSION METHOD, RECEPTION DEVICE, AND RECEPTION METHOD

(71) Applicant: SONY GROUP CORPORATION, Tokyo (JP)

(72) Inventor: Ikuo Tsukagoshi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/847,774

(22) Filed: Jun. 23, 2022

(65) Prior Publication Data
US 2022/0329753 A1 Oct. 13, 2022

Related U.S. Application Data

(63) Continuation of application No. 17/215,961, filed on Mar. 29, 2021, now Pat. No. 11,412,176, which is a continuation of application No. 15/756,212, filed as application No. PCT/JP2016/076248 on Sep. 7, 2016, now Pat. No. 11,006,069.

(51) Int. Cl.
*H04N 7/01* (2006.01)
*H04N 21/438* (2011.01)
(Continued)

(52) U.S. Cl.
CPC ............ *H04N 7/0127* (2013.01); *H04N 7/01* (2013.01); *H04N 19/31* (2014.11);
(Continued)

(58) Field of Classification Search
None
See application file for complete search history.

(56) References Cited

U.S. PATENT DOCUMENTS

2004/0036800 A1  2/2004  Ohki
2006/0303941      12/2008  Ohki
(Continued)

FOREIGN PATENT DOCUMENTS

CN  101933337 A  12/2010
CN  102474650 A  5/2012
(Continued)

OTHER PUBLICATIONS

Adikari, A.B.B., et al. "A H.264 Compliant Stereoscopic Video Codec", Electrical and Computer Engineering, 2005, Canadianconference on Saskatoon, SK, Canada May 1-4, 2005, IEEE, May 1, 2005[May 1, 2005] pp. 1622-1625, XP 010869087.
(Continued)

*Primary Examiner* — Samira Monshi
(74) *Attorney, Agent, or Firm* — Oblon, McClelland, Maier & Neustadt, L.L.P.

(57) ABSTRACT

To preferably transmit normal-frame-rate and high-frame-rate image data.
A first ratio mixing processing is performed on two temporally-consecutive pictures in high-frame-rate image data to obtain basic-frame-rate image data, and a second ratio mixing processing is performed on the two temporally-consecutive pictures to obtain high-frame-rate image data of an extended frame. An encoding processing is performed on the reference-frame-rate image data to obtain a basic stream and an encoding processing is performed on the high-frame-rate image data of the extended frame to obtain an extended stream. A container including the basic stream and the extended stream in a predetermined format is transmitted.

16 Claims, 14 Drawing Sheets

(51) Int. Cl.
  *H04N 19/70* (2014.01)
  *H04N 19/31* (2014.01)
  *H04N 19/587* (2014.01)
  *H04N 19/85* (2014.01)
  *H04N 21/2343* (2011.01)
  *H04N 21/2662* (2011.01)
  *H04N 19/132* (2014.01)

(52) U.S. Cl.
  CPC ........... *H04N 19/587* (2014.11); *H04N 19/70* (2014.11); *H04N 19/85* (2014.11); *H04N 21/234381* (2013.01); *H04N 21/438* (2013.01); *H04N 19/132* (2014.11); *H04N 21/2662* (2013.01)

(56) References Cited

U.S. PATENT DOCUMENTS

| | | |
|---|---|---|
| 2009/0219404 A1 | 9/2009 | Kobayashi |
| 2011/0242291 A1 | 10/2011 | Kato |
| 2013/0308049 A1 | 11/2013 | Ohki |
| 2014/0168366 A1 | 6/2014 | Ichiki |
| 2016/0234500 A1 | 8/2016 | Tsukagoshi |

FOREIGN PATENT DOCUMENTS

| | | |
|---|---|---|
| CN | 102027751 A | 4/2013 |
| CN | 103621075 A | 3/2014 |
| JP | 2004-88244 A | 3/2004 |
| JP | 2006-333071 A | 12/2006 |
| JP | 2009182935 A | 8/2009 |
| JP | 2009 225431 | 10/2009 |
| WO | WO-2012166512 A2 | 12/2012 |
| WO | 2015/076277 A1 | 5/2015 |

OTHER PUBLICATIONS

Anonymous: "The H.264 Advanced Video Compression Standard, 2ndEdition, chapter 10, Extensions and directions", Iain E. Richardson, Not Known, Apr. 20, 2010 (Apr. 20, 2010), XP030001641, pp. 267-311.

Intertasional Search Report dated Dec. 13, 2016 in PCT/JP2016/076248 filed Sep. 7, 2010.

| Syntax | No. of Bits | Format |
|---|---|---|
| inverse_blending_layer_prediction_SEI ( ) { | | |
|     inverse_blending_layer_prediction_id | 16 | uimsbf |
|     inverse_blending_layer_prediction_length | 8 | uimsbf |
|     blend_coef_alpha | 4 | uimsbf |
|     blend_coef_beta | 4 | uimsbf |
| } | | |

(b)

```
blend_coef_alpha (8bits)    INDICATING COEFFICIENT α.
         0x0            0
         0x1            0.2
         0x2            0.25
         0x3            0.33
         0x4            0.5
         0x5            0.67
         0x6            0.75
         0x7            0.8
         0x8            1

Blend_coef_beta (8bits)     INDICATING COEFFICIENT β.
         0x0            0
         0x1            0.2
         0x2            0.25
         0x3            0.33
         0x4            0.5
         0x5            0.67
         0x6            0.75
         0x7            0.8
         0x8            1
```

| Syntax | No. of Bits | Format |
|---|---|---|
| video_scalability_information_descriptor() { | | |
|   video_scalability_information_descriptor_tag | 8 | uimsbf |
|   video_scalability_information_descriptor_length | 8 | uimsbf |
|   temporal_scalable_flag | 1 | bslbf |
|   picture_blending_for_base_stream_flag | 1 | bslbf |
|   reserved | 6 | 0x0 |
|   if( picture_blending_for_base_stream_flag ){ | | |
|     blend_coef_alpha | 4 | uimsbf |
|     blend_coef_beta | 4 | uimsbf |
|   } | | |
| } | | |

(b)

temporal_scalable_flag (1bit) INDICATING WHETHER STREAM IS TEMPORALLY SCALABLE.
  '1' TEMPORALLY SCALABLE
  '0' NOT TEMPORALLY SCALABLE picture_blending_for_base_stream_flag (1bit) INDICATING WHETHER PICTURE MIXING PROCESSING IS PERFORMED ON BASIC STREAM.
  '1' MIXING PROCESSING IS PERFORMED
  '0' MIXING PROCESSING IS NOT PERFORMED

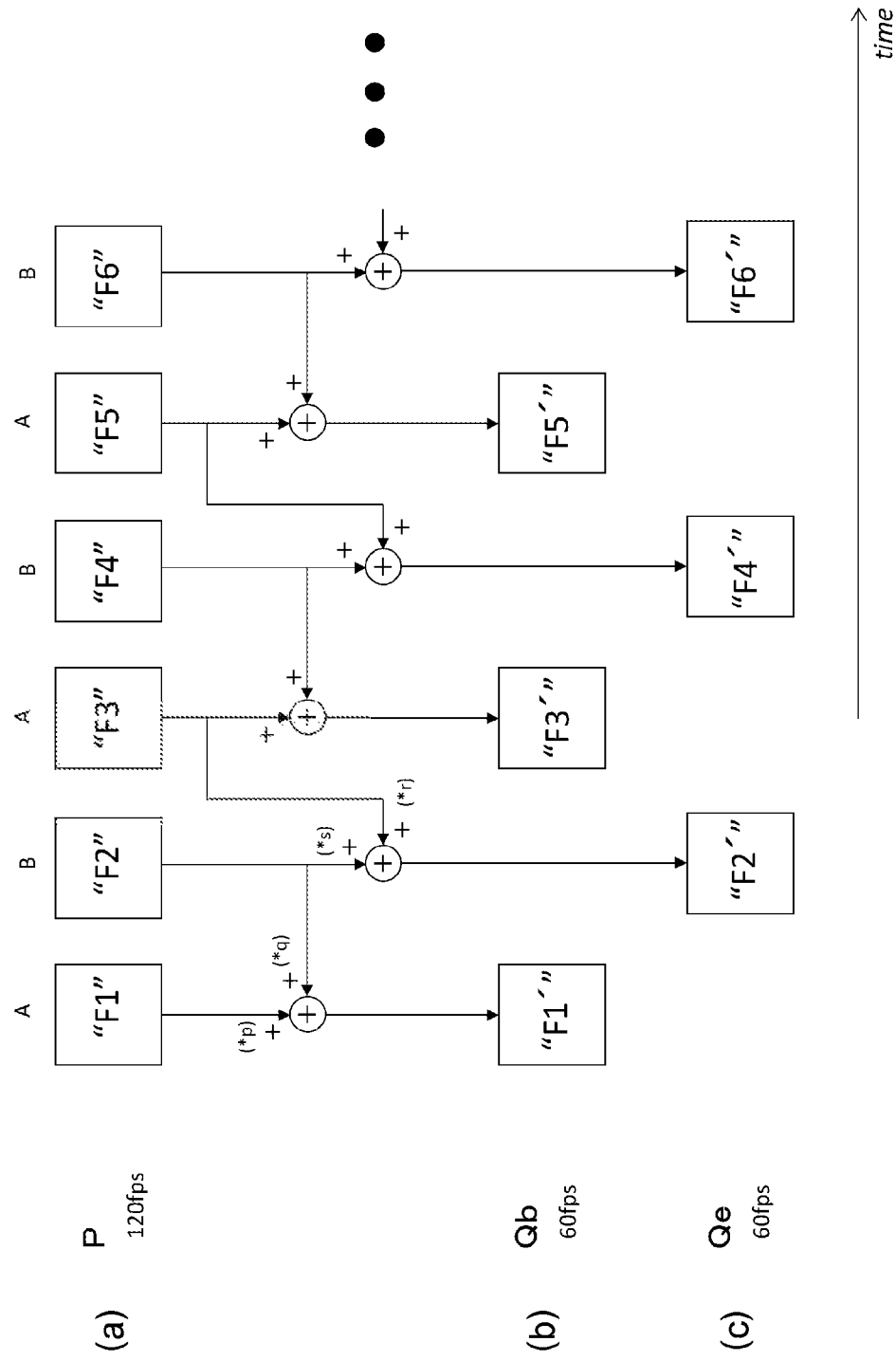

TRANSMISSION DEVICE, TRANSMISSION METHOD, RECEPTION DEVICE, AND RECEPTION METHOD

CROSS REFERENCE TO RELATED APPLICATION

This is a continuation of U.S. application Ser. No. 17/215,961, filed Mar. 29, 2021, which is a continuation of U.S. application Ser. No. 15/756,212, filed Feb. 28, 2018 (now U.S. Pat. No. 11,006,069), the entire contents of each of which are incorporated herein by reference. U.S. application Ser. No. 15/756,212 is a National Stage Application of PCT/JP2016/076248, filed Sep. 7, 2016, and also claims priority under 35 U.S.C. 119 to Japanese Application No. 2015-178976, filed on Sep. 10, 2015, the entire contents of which are incorporated herein by reference.

TECHNICAL FIELD

The present technology relates to a transmission device, a transmission method, a reception device, and a reception method, and particularly to a transmission device and the like for transmitting high-frame-rate moving image data.

BACKGROUND ART

In recent years, a camera for performing high-frame-rate shooting by a high-speed frame shutter has been known. For example, a normal frame rate is 60 fps, 50 fps, or the like, while a high frame rate is several times or several tens of times higher, or several hundred times higher.

In a case where a high-frame-rate service is provided, moving image data shot by a high-speed frame shutter may be converted into a moving image sequence at a lower frequency and transmitted. However, an image by the high-speed frame shutter has an effect of improving motion blurring and realizing image quality with high sharpness, but has a factor of causing a problem of image quality in a conventional frame interpolation technique on reception/reproduction side.

Frame interpolation using an image with high sharpness shot by a high-speed frame shutter has a large difference between a case where motion vector search is adapted and a case where it is not adapted. This is because the difference therebetween is displayed as a conspicuous deterioration in image quality. High-load calculation is required for improving an accuracy of the motion vector search during the frame interpolation, which has an effect on cost of a receiver.

The present applicants have proposed a technique for converting an image material shot by a high-speed frame shutter and displaying the material at certain or more image quality on a conventional receiver for performing normal-frame-rate decoding (see Patent Document 1).

CITATION LIST

Patent Document

Patent Document 1: International Publication No. 2015/076277

SUMMARY OF THE INVENTION

Problems to be Solved by the Invention

The present technology is directed to preferably transmitting normal-frame-rate and high-frame-rate moving image data.

Solutions to Problems

A concept of the present technology is a transmission device including:

an image processing unit that performs a first ratio mixing processing on two temporally-consecutive pictures in high-frame-rate image data to obtain basic-frame-rate image data, and performs a second ratio mixing processing on the two temporally-consecutive pictures to obtain high-frame-rate image data of an extended frame;

an image encoding unit that performs an encoding processing on the reference-frame-rate image data to obtain a basic stream and performs an encoding processing on the high-frame-rate image data of the extended frame to obtain an extended stream; and a transmission unit that transmits a container including the basic stream and the extended stream in a predetermined format.

According to the present technology, the image processing unit obtains basic-frame-rate image data and high-frame-rate image data of an extended frame from high-frame-rate image data. Here, the basic-frame-rate image data is obtained by performing the first ratio mixing processing on two temporally-consecutive pictures in predetermined-frame-rate image data. The high-frame-rate image data of the extended frame is obtained by performing the second ratio mixing processing on the two temporally-consecutive pictures.

The image encoding unit performs an encoding processing on the reference-frame-rate image data to obtain a basic stream, and performs an encoding processing on the high-frame-rate image data of the extended frame to obtain an extended stream. A container including the basic stream and the extended stream in a predetermined format is transmitted by the transmission unit. For example, there may be configured such that the image processing unit supplies the image encoding unit with the basic-frame-rate image data and the high-frame-rate image data of the extended frame as one system of image data, and the system of image data is added with identification information for identifying the respective frames of the basic-frame-rate image data and the high-frame-rate image data of the extended frame.

In this way, according to the present technology, the first ratio mixing processing is performed on two temporally-consecutive pictures in high-frame-rate image data to obtain basic-frame-rate image data with a higher aperture ratio, and a basic stream obtained by performing the encoding processing on the basic-frame-rate image data is transmitted. Thus, in a case of a receiver having a decoding capability of processing of the basic-frame-rate image data, the basic stream is processed to obtain the basic-frame-rate image data, thereby displaying a smooth image as moving image and avoiding causing a problem of image quality in a frame interpolation processing with low-load calculation in a display processing.

Further, according to the present technology, an extended stream including the high-frame-rate image data of the extended frame obtained by performing the second ratio mixing processing on the two temporally-consecutive pictures is transmitted together with the basic stream. Thus, in a case of a receiver having a decoding capability of processing the high-frame-rate image data, the extended stream is processed to obtain the high-frame-rate image data of the extended frame, which is combined with the basic-frame-rate image data to obtain high-frame-rate image data, thereby preferably performing high-frame-rate image display.

Additionally, according to the present technology, for example, an information insertion unit for one of or both inserting mixing ratio information regarding the first ratio into a layer of the basic stream and inserting mixing ratio information regarding the second ratio into a layer of the extended stream may be further provided. In this case, for example, the basic stream and the extended stream have a NAL unit structure, and the information insertion unit may be configured to insert a SEI NAL unit having the mixing ratio information into the basic stream and/or the extended stream. The mixing ratio information is inserted into the layer of the extended stream in this way, and thus the reception side can easily recognize at which mixing ratio the basic-frame-rate image data or the high-frame-rate image data of the extended frame is mixed. For example, a reverse processing to the mixing processing can be easily and appropriately performed by use of the mixing ratio information.

Further, according to the present technology, for example, the information insertion unit that inserting identification information indicating that the image data included in the basic stream is obtained by performing the mixing processing into the layer of the container may be further provided. In this case, the reception side can easily recognize, from the identification information, that the image data included in the basic stream is obtained by performing the mixing processing.

Further, other concept of the present technology is a reception device including:

a reception unit that receives a container including a basic stream and an extended stream in a predetermined format, in which the basic stream is obtained by performing an encoding processing on basic-frame-rate image data obtained by performing a first ratio mixing processing on two temporally-consecutive pictures in high-frame-rate image data, and the extended stream is obtained by performing an encoding processing on high-frame-rate image data of an extended frame obtained by performing a second ratio mixing processing on the two temporally-consecutive pictures, the reception device further including a processing unit that processes only the basic stream to obtain basic-frame-rate image data or processes both the basic stream and the extended stream to obtain high-frame-rate image data.

According to the present technology, the reception unit receives a container including a basic stream and an extended stream in a predetermined format. The basic stream is obtained by performing an encoding processing on basic-frame-rate image data obtained by performing the first ratio mixing processing on two temporally-consecutive pictures in high-frame-rate image data. The extended stream is obtained by performing an encoding processing on high-frame-rate image data of an extended frame obtained by performing the second ratio mixing processing on the two temporally-consecutive pictures.

The processing unit processes only the basic stream to obtain basic-frame-rate image data or processes both the basic stream and the extended stream to obtain high-frame-rate image data.

For example, in order to obtain the high-frame-rate image data, the processing unit may perform a processing of performing a decoding processing on the basic stream to obtain the basic-frame-rate image data and performing a decoding processing on the extended stream to obtain the high-frame-rate image data of the extended frame, and a processing of combining the basic-frame-rate image data with the high-frame-rate image data of the extended frame to obtain the high-frame-rate image data. In this case, the high-frame-rate image data can be easily obtained.

Further, for example, in order to obtain the high-frame-rate image data, the processing unit may perform a processing of performing a decoding processing on the basic stream to obtain the basic-frame-rate image data and performing a decoding processing on the extended stream to obtain the high-frame-rate image data of the extended frame, a processing of performing a reverse processing to the mixing processing on the basic-frame-rate image data and the high-frame-rate image data of the extended frame to obtain image data of one and the other pictures in the two temporally-consecutive pictures, and a processing of combining the image data of one and the other pictures in the two temporally-consecutive pictures to obtain the high-frame-rate image data. In this case, the reverse processing to the mixing processing is performed, and thus the finally-obtained high-frame-rate image data is reproduced in its original shutter aperture ratio, thereby enhancing image quality in high-frame-rate image display.

In this way, according to the present technology, in a case where the decoding capability of processing the basic-frame-rate image data is provided, only the basic stream is processed to obtain the basic-frame-rate image data. The basic frame-rate image data is obtained by performing the first ratio mixing processing on two temporally-consecutive pictures in the high-frame-rate image data, and the aperture ratio is increased. Thus, it is possible to display a smooth image as moving image and to avoid causing a problem of image quality in a frame interpolation processing with low-load calculation in a display processing.

Further, according to the present technology, in a case where the decoding capability of processing the high-frame-rate image data is provided, the basic stream is processed to obtain the basic-frame-rate image data, the extended stream is processed to obtain the high-frame-rate image data of the extended frame, and further they are combined to obtain the high-frame-rate image data. Thus, high-frame-rate image display can be preferably performed.

Further, other concept of the present technology is a transmission device including:

an image processing unit that performs a first ratio mixing processing on image data of a first frame and image data of a second frame subsequent to the first frame in high-frame-rate image data in which the first frame and the second frame are alternately consecutive to obtain basic-frame-rate image data, and performs a second ratio mixing processing on the image data of the second frame and the image data of the first frame subsequent to the second frame to obtain high-frame-rate image data of an extended frame;

an image encoding unit that performs an encoding processing on the reference-frame-rate image data to obtain a basic stream, and performs an encoding processing on the high-frame-rate image data of the extended frame to obtain an extended stream; and a transmission unit that transmits a container including the basic stream and the extended stream in a predetermined format.

According to the present technology, the image processing unit obtains basic-frame-rate image data and high-frame-rate image data of an extended frame from high-frame-rate image data. Here, the basic-frame-rate image data is obtained by performing the first ratio mixing processing on image data of a first frame and image data of a second frame subsequent to the first frame in high-frame-rate image data in which the first frame and the second frame are alternately consecutive. The high-frame-rate image data of the extended frame is obtained by performing the second ratio mixing processing on the image data of the second frame and the image data of the first frame subsequent to the second frame in the high-frame-rate image data.

The image encoding unit performs an encoding processing on the basic-frame-rate image data to obtain a basic stream and performs an encoding processing on the high-frame-rate image data of the extended frame to obtain an extended stream. The transmission unit transmits a container including the basic stream and the extended stream in a predetermined format. For example, there may be configured such that the image processing unit supplies the image encoding unit with the basic-frame-rate image data and the high-frame-rate image data of the extended frame as one system of image data, and the system of image data is added with identification information for identifying the respective frames of the basic-frame-rate image data and the high-frame-rate image data of the extended frame.

In this way, according to the present technology, the basic stream, which is obtained by performing the first ratio mixing processing on image data of a first frame and image data of a second frame subsequent to the first frame in high-frame-rate image data in which the first frame and the second frame are alternately consecutive and which includes the basic-frame-rate image data with a higher aperture ratio, is transmitted. Thus, in a case of a receiver having the decoding capability of processing the basic-frame-rate image data, the basic stream is processed to obtain the basic-frame-rate image data, thereby displaying a smooth image as moving image and avoiding causing a problem of image quality in a frame interpolation processing with low-load calculation in a display processing.

Further, according to the present technology, the extended stream including the high-frame-rate image data of the extended frame obtained by performing the second ratio mixing processing on the image data of the second frame and the image data of the first frame subsequent to the second frame in the high-frame-rate image data is transmitted together with the basic stream. Thus, in a case of a receiver having the decoding capability of processing the high-frame-rate image data, the extended stream is processed to obtain the high-frame-rate image data of the extended frame, which is combined with the basic-frame-rate image data to obtain the high-frame-rate image data, thereby preferably performing high-frame-rate image display.

Here, the basic-frame-rate image data is obtained by performing the mixing processing on the image data of the first frame and the image data of the second frame subsequent to the first frame, the high-frame-rate image data of the extended frame is obtained by performing the second ratio mixing processing on the image data of the second frame and the image data of the first frame subsequent to the second frame, and the frame continuity of the high-frame-rate image data obtained by the combining is excellent, thereby smoothly performing high-frame-rate image display.

Additionally, according to the present technology, for example, an information insertion unit for one of or both inserting mixing ratio information regarding the first ratio into a layer of the basic stream and inserting mixing ratio information regarding the second ratio into a layer of the extended stream may be further provided. In this case, for example, the basic stream and the extended stream may have a NAL unit structure, and the information insertion unit may insert a SEI NAL unit having the mixing ratio information into the basic stream and/or the extended stream. The mixing ratio information is inserted into the layer of the extended stream in this way, and thus the reception side can easily recognize at which mixing ratio the basic-frame-rate image data or the high-frame-rate image data of the extended frame is mixed.

Further, according to the present technology, for example, the information insertion unit that inserts identification information indicating that the image data included in the basic stream is obtained by performing the mixing processing into a layer of the container may be further provided. In this case, the reception side can easily recognize, from the identification information, that the image data included in the basic stream is obtained by performing the mixing processing.

Further, other concept of the present technology is a reception device including:

a reception unit that receives a container including a basic stream and an extended stream in a predetermined format, in which the basic stream is obtained by performing an encoding processing on basic-frame-rate image data obtained by performing a first ratio mixing processing on image data of a first frame and image data of a second frame subsequent to the first frame in high-frame-rate image data in which the first frame and the second frame are alternately consecutive, and the extended stream is obtained by performing an encoding processing on high-frame-rate image data of an extended frame obtained by performing a second ratio mixing processing on the image data of the second frame and the image data of the first frame subsequent to the second frame in the high-frame-rate image data, the reception device further including a processing unit that processes only the basic stream to obtain the basic-frame-rate image data or processes both the basic stream and the extended stream to obtain the high-frame-rate image data.

According to the present technology, the reception unit receives a container including a basic stream and an extended stream in a predetermined format. The basic stream is obtained by performing an encoding processing on basic-frame-rate image data obtained by performing the first ratio mixing processing on image data of a first frame and image data of a second frame subsequent to the first frame in high-frame-rate image data in which the first frame and the second frame are alternately consecutive. The extended stream is obtained by performing an encoding processing on high-frame-rate image data of an extended frame obtained by performing the second ratio mixing processing on the image data of the second frame and the image data of the first frame subsequent to the second frame in the high-frame-rate image data.

The processing unit processes only the basic stream to obtain basic-frame-rate image data, or processes both the basic stream and the extended steam to obtain high-frame-rate image data.

For example, in order to obtain the high-frame-rate image data, the processing unit may perform a processing of performing a decoding processing on the basic stream to obtain the basic-frame-rate image data and performing a decoding processing on the extended stream to obtain the high-frame-rate image data of the extended frame, and a processing of combining the basic-frame-rate image data with the high-frame-rate image data of the extended image to obtain the high-frame-rate image data. In this case, the high-frame-rate image data can be easily obtained.

In this way, according to the present technology, in a case where the decoding capability of processing the basicframe-rate image data is provided, only the basic stream is processed to obtain the basic-frame-rate image data. The basic-frame-rate image data is obtained by performing the first ratio mixing processing on image data of a first frame and image data of a second frame subsequent to the first frame in high-frame-rate image data in which the first frame and the second frame are alternately consecutive, and its aperture ratio is increased. Thus, it is possible to display a smooth image as moving image and to avoid causing a problem of image quality in a frame interpolation processing with low-load calculation in a display processing.

Further, according to the present technology, in a case where the decoding capability of processing the high-frame-rate image data is provided, the basic stream is processed to obtain the basic-frame-rate image data, the extended stream is processed to obtain the high-frame-rate image data of the extended frame, and further they are combined to obtain the high-frame-rate image data. Therefore, high-frame-rate image display can be preferably performed.

Here, the basic-frame-rate image data is obtained by performing the mixing processing on image data of a first frame and image data of a second frame subsequent to the first frame, the high-frame-rate image data of the extended frame is obtained by performing the second ratio mixing processing on the image data of the second frame and the image data of the first frame subsequent to the second frame, and the frame continuity of the high-frame-rate image data obtained by the combining is excellent, thereby smoothly performing high-frame-rate image display.

Effects of the Invention

According to the present technology, it is possible to preferably transmit normal-frame-rate (basic-frame-rate) and high-frame-rate image data. Additionally, the effects described herein are not restrictive, and any effect described in the present disclosure may be obtained.

BRIEF DESCRIPTION OF DRAWINGS

FIG. 7 is diagrams illustrating an exemplary structure of inverse blending layer prediction SEI and contents of main information in the exemplary structure.

FIG. 8 is diagrams illustrating an exemplary structure of video scalability information descriptor and contents of main information in the exemplary structure.

FIG. 15 is a diagram illustrating an exemplary relationship between input data (image data P) of the preprocessor and output data (image data Qb and Qe).

MODE FOR CARRYING OUT THE INVENTION

A mode for carrying out the present invention (which will be denoted as "embodiment" below) will be described below. Additionally, the description will be made in the following order.
1. Embodiment
2. Variant 1. Embodiment

[Transmission/Reception System]

Figure 1:
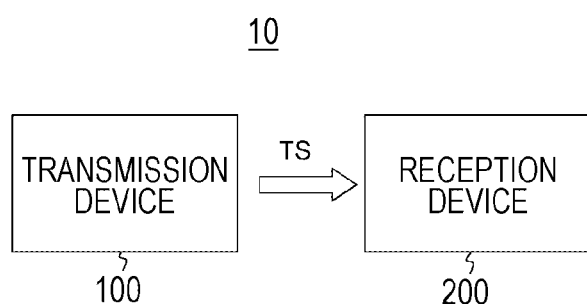
FIG. 1 is a block diagram illustrating an exemplary configuration of a transmission/reception system according to an embodiment.

FIG. 1 illustrates an exemplary configuration of a transmission/reception system 10 according to an embodiment. The transmission/reception system 10 includes a transmission device 100 and a reception device 200.

The transmission device 100 transmits a transport stream TS as a container on a broadcast wave. The transport stream TS includes a basic stream (basic video stream) and an extended stream (extended video stream) which are obtained by processing image data (moving image data) of a high frame rate or 120 fps according to the embodiment. The basic stream and the extended stream are assumed to have a NAL unit structure according to the embodiment.

Here, the basic stream is obtained by performing an encoding processing on basic-frame-rate (normal-frame-rate) image data obtained by performing a first ratio mixing processing on two temporally-consecutive pictures in high-frame-rate image data. The basic stream includes encoded image data per picture of the basic-frame-rate image data as access unit. The basic-frame-rate image data is 60 fps-image data.

Further, the extended stream is obtained by performing an encoding processing on high-frame-rate image data of an extended frame obtained by performing a second ratio mixing processing on the two temporally-consecutive pictures. The extended stream includes encoded image data per picture of the high-frame-rate image data of the extended frame as access unit. The high-frame-rate image data of the extended frame is 60 fps-image data.

Figure 2:
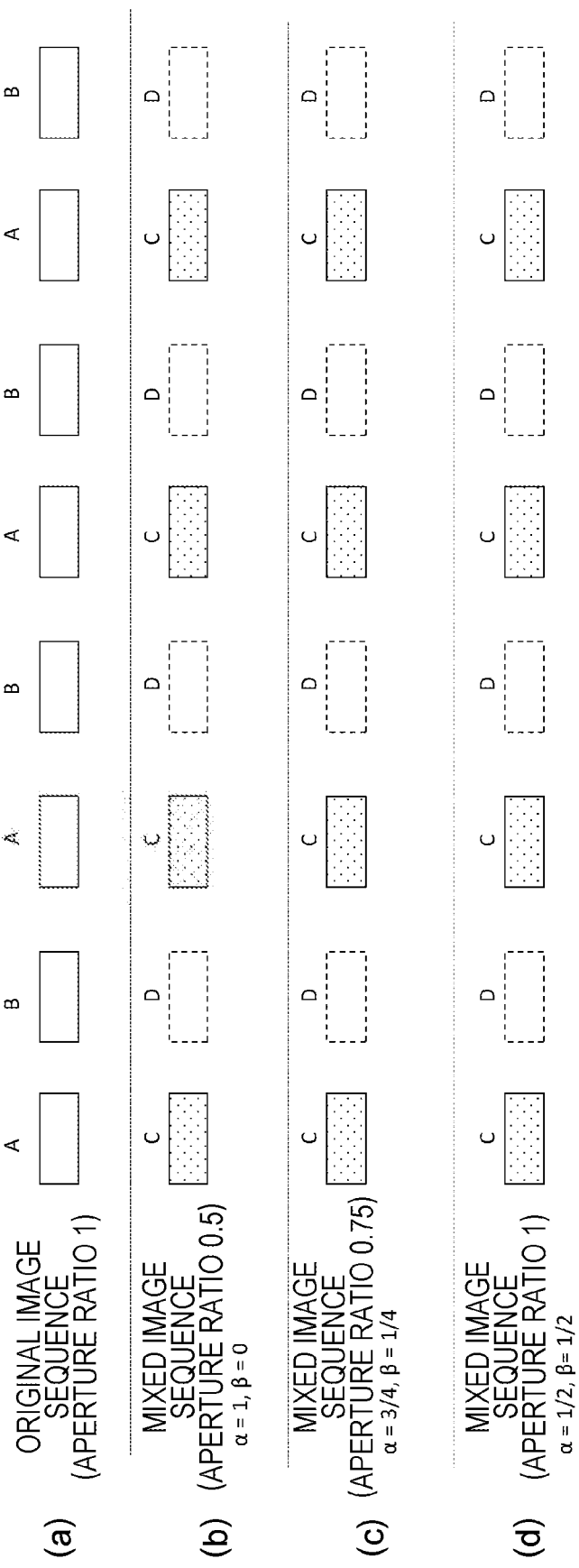
FIG. 2 is diagrams for explaining a shutter aperture ratio changing depending on a mixing ratio.

Here, the high-frame-rate image data is assumed as original image sequence (high-speed shutter image sequence) as illustrated in FIG. 2(*a*). In the Figure, "A" and "B" indicate image data of the first picture and image data of the second picture in two temporally-consecutive pictures, respectively. The shutter aperture ratio of the original image sequence is 1 (100%). Though not illustrated, the shutter aperture ratio of the image sequence of "A" or "B" simply extracted from the high-frame-rate image data is ½ (50%).

To the contrary, the shutter aperture ratio of a mixed image sequence obtained by performing the mixing processing in units of two pictures is between ½ (50%) and 1 (100%) as illustrated in FIGS. 2(*b*) to 2(*d*). In the Figures, "C" indicates basic-frame-rate image data obtained by performing the first ratio mixing processing in units of two pictures, and "D" indicates high-frame-rate image data of an extended frame obtained by performing the second ratio mixing processing in units of two pictures. Here, the mixed image sequence of "C" is paid attention to.

For example, as illustrated in FIG. 2(b), when a coefficient α of the first picture is 1 and a coefficient β of the second picture is 0, the shutter aperture ratio of the mixed image sequence is ½ (50%). Further, for example, as illustrated in FIG. 2(c), when the coefficient α of the first picture is ¾ and the coefficient β of the second picture is ¼, the shutter aperture ratio of the mixed image sequence is ¾ (75%). Further, for example, as illustrated in FIG. 2(d), when the coefficient α of the first picture is ½ and the coefficient of the second picture is ½, the shutter aperture ratio of the mixed image sequence is 1 (100%).

The mixing ratio information in the mixing processing is inserted into a layer of the basic steam and/or the extended stream. In this case, the mixing ratio information regarding the first ratio is inserted into the layer of the basic stream, and the mixing ratio information regarding the second ratio is inserted into the layer of the extended stream. For example, the mixing ratio information is assumed as information regarding the coefficient α of the first picture and the coefficient β of the second picture in units of two pictures. According to the embodiment, a SEI NAL unit having the mixing ratio information is inserted into the basic stream and/or the extended stream. The mixing ratio information enables the reception side to easily recognize at which mixing ratio the basic-frame-rate image data or the high-frame-rate image data of the extended frame is mixed.

Identification information indicating that the image data included in the basic stream is obtained by performing the mixing processing is inserted into a layer of the container. According to the embodiment, a descriptor describing the identification information is inserted into a video elementary stream loop arranged corresponding to the extended stream under a program map table (PMT). The reception side can easily recognize, from the identification information, that the image data included in the basic stream is obtained by performing the mixing processing.

The reception device 200 receives the transport stream TS sent on a broadcast wave from the transmission device 100. In a case where the reception device 200 has a decoding capability of processing 60 fps-image data, it processes only the basic stream included in the transport streams TS to obtain basic-frame-rate (60 fps) image data, and reproduces the image.

On the other hand, in a case where the reception device 200 has a decoding capability of processing 120 fps-image data, it processes both the basic stream and the extended stream included in the transport streams TS to obtain high-frame-rate (120 fps) image data, and reproduces the image.

In this case, for example, the reception device 200 performs the decoding processing on the basic stream to obtain the basic-frame-rate image data, and performs the decoding processing on the extended stream to obtain the high-frame-rate image data of the extended frame, and then combines the basic-frame-rate image data with the high-frame-rate image data of the extended frame to obtain high-frame-rate image data. In this case, the high-frame-rate image data can be easily obtained.

Further, in this case, for example, the reception device 200 obtains the basic-frame-rate image data and the high-frame-rate image data of the extended frame, and then performs a reverse processing to the mixing processing on the image data to obtain the image data of one and the other pictures in the two temporally-consecutive pictures, and combines the image data to obtain the high-frame-rate image data. In this case, the reverse processing to the mixing processing is performed, and thus the finally-obtained high-frame-rate image data is reproduced in its original shutter aperture ratio, and image quality of high-frame-rate image display can be enhanced.

Figure 3:
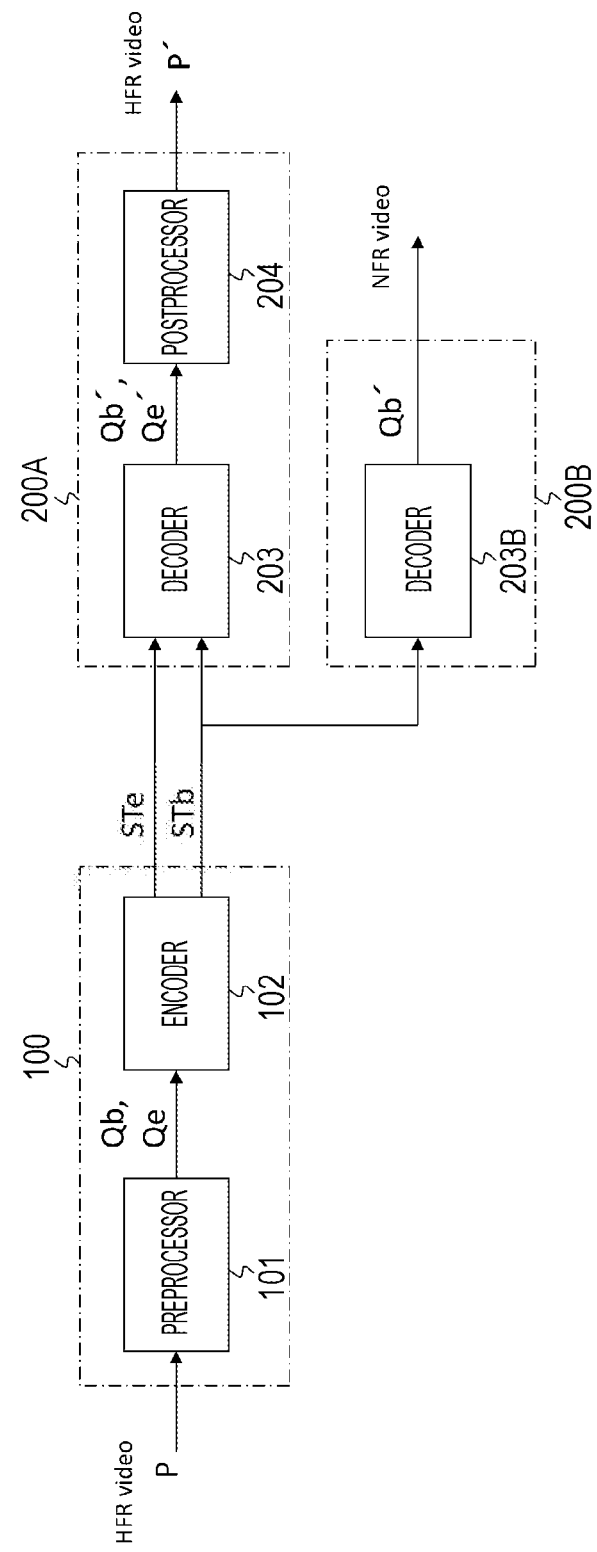
FIG. 3 is a diagram illustrating an outline of the processing of a transmission device and a reception device.

FIG. 3 illustrates an outline of the processing of the transmission device 100 and the reception device 200. 120P-sequence image data P is input into the transmission device 100. In the transmission device 100, the image data P is processed by a preprocessor 101 to obtain basic-frame-rate image data Qb and high-frame-rate image data Qe of the extended frame. Then in the transmission device 100, the encoding processing is performed on the image data Qb and Qe in an encoder 102 to obtain a basic stream STb and an extended stream STe. The two streams STb and STe are transmitted from the transmission device 100 to the reception device 200.

In a reception device 200A having a decoding capability of processing 120 fps-image data, the decoding processing is performed on the two streams STb and STe in a decoder 203 to obtain basic-frame-rate image data Qb' and high-frame-rate image data Qe' of an extended frame. Then in the reception device 200A, the image data Qb' and Qe' are processed in a postprocessor 204 to obtain 120P-sequence image data P'.

On the other hand, in a reception device 200B having a decoding capability of processing 60 fps-image data, the decoding processing is performed on the stream STb in a decoder 203B to obtain the basic-frame-rate image data Qb'. Then in the reception device 200B, the image data Qb' is 60P-sequence image data as it is.

[Configuration of Transmission Device]

Figure 4:
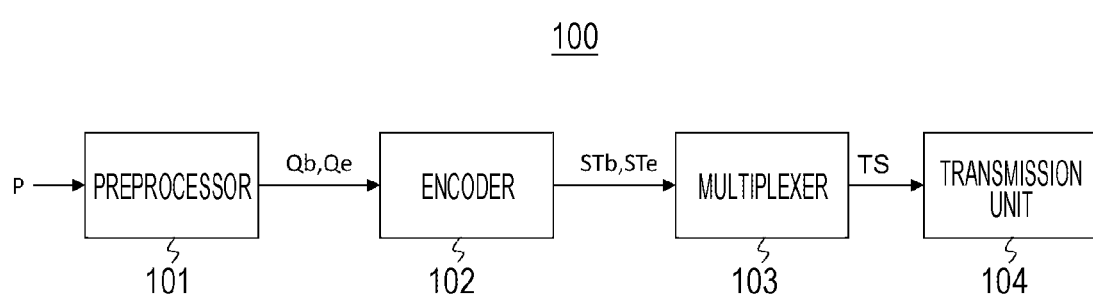
FIG. 4 is a block diagram illustrating an exemplary configuration of the transmission device.

FIG. 4 illustrates an exemplary configuration of the transmission device 100. The transmission device 100 includes the preprocessor 101, the encoder 102, a multiplexer 103, and a transmission unit 104. The preprocessor 101 inputs 120 fps-image data P, and outputs the basic-frame-rate image data Qb and the high-frame-rate image data Qe of the extended frame.

Here, the preprocessor 101 performs the first ratio mixing processing on two temporally-consecutive pictures in the 120 fps-image data P to obtain the basic-frame-rate image data Qb. Further, the preprocessor 101 performs the second ratio mixing processing on the two temporally-consecutive pictures to obtain the high-frame-rate image data Qe of the extended frame.

FIG. 5(a) illustrates an exemplary configuration of the preprocessor 101. The preprocessor 101 includes delay circuits 111 and 114 for delaying by one frame of 120 fps, a calculation circuit 112, and a switch circuit 115. Further, the calculation circuit 112 includes coefficient multiplication units 112a, 112b, 112c, and 112d, and addition units 112e and 112f.

The coefficient multiplication units 112a and 112b and the addition unit 112e are used for performing the first ratio mixing processing on the two temporally-consecutive pictures. A coefficient p is multiplied in the coefficient multiplication unit 112a and a coefficient q is multiplied in the coefficient multiplication unit 112b. Additionally, p=0 to 1 and q=1−p are met. Further, the coefficient multiplication units 112c and 112d and the addition unit 112f are used for performing the second ratio mixing processing on the two temporally-consecutive pictures. A coefficient r is multiplied in the coefficient multiplication unit 112c and a coefficient s is multiplied in the coefficient multiplication unit 112d. Additionally, r=0 to 1 and s=1−r are met.

The 120 fps-image data P is delayed by one frame in the delay circuit 111 and then input into the coefficient multiplication units 112*a* and 112*c* configuring the calculation circuit 112. Further, the 120 fps-image data P is input into the coefficient multiplication units 112*b* and 112*d* configuring the calculation circuit 112 as it is. The outputs of the coefficient multiplication units 112*a* and 112*b* are input into and added in the addition unit 112*e*. Further, the outputs of the coefficient multiplication units 112*c* and 112*d* are input into and added in the addition unit 112*f*.

Figure 5:
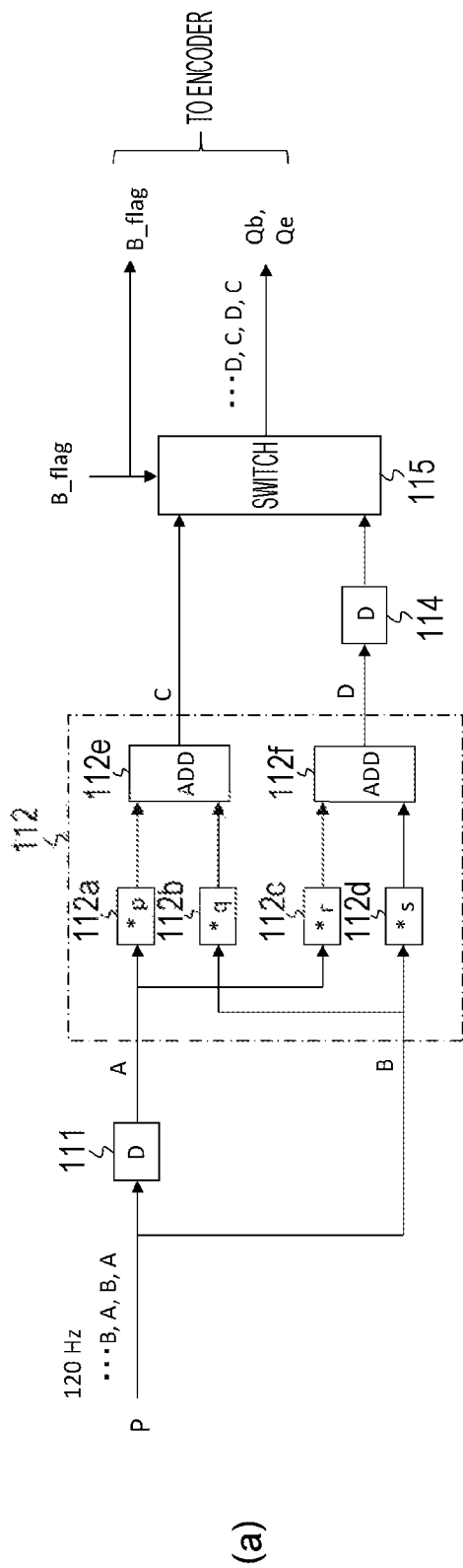
FIG. 5 is a block diagram illustrating an exemplary configuration of a preprocessor.

Here, when the image data of the two temporally-consecutive pictures in the image data P are assumed as A and B, the mix output of C (=p*A+q*B) is obtained as the output of the addition unit 112*e* and the mix output of D (=r*A+s*B) is obtained as the output of the addition unit 112*f* at a timing when the output of the delay circuit 111 is A. FIG. 5(*b*) illustrates the calculation for the mixing processing in the calculation circuit 112 in a mathematical equation.

The output of the addition unit 112*e* in the calculation circuit 112 is input into the switch circuit 115 as it is. On the other hand, the output of the addition unit 112*f* in the calculation circuit 112 is delayed by one frame in the delay circuit 114, and then input into the switch circuit 115. The witch circuit 115 is supplied with a flag signal B_flag as a switch control signal. The flag signal B_flag alternately takes "1" or "0" at a cycle of 120 Hz, takes "1" at a timing when the output of the addition unit 112*e* is the mix output C, and takes "0" at a timing when the output of the delay circuit 114 is the mix output D.

In the switch circuit 115, the mix output C as the output of the addition unit 112*e* is taken out when the flag signal B_flag takes "1" and the mix output D as the output of the delay circuit 114 is taken out when the flag signal B_flag takes "0". Here, the mix output C configures the basic-frame-rate image data Qb obtained by performing the first ratio mixing processing on two temporally-consecutive pictures in the image data P. Further, the mix output D configures the high-frame-rate image data Qe of the extended frame obtained by performing the second ratio mixing processing on the two temporally-consecutive pictures.

The image data Qb and Qe are output as one system of image data from the switch circuit 115 and sent to the encoder 102. Here, the system of image data with the flag signal B_flag is sent. The flag signal B_flag enables the encoder 102 to identify whether a current frame (picture) of the image data sent in one system is a frame of the image data Qb or a frame of the image data Qe.

Figure 6:
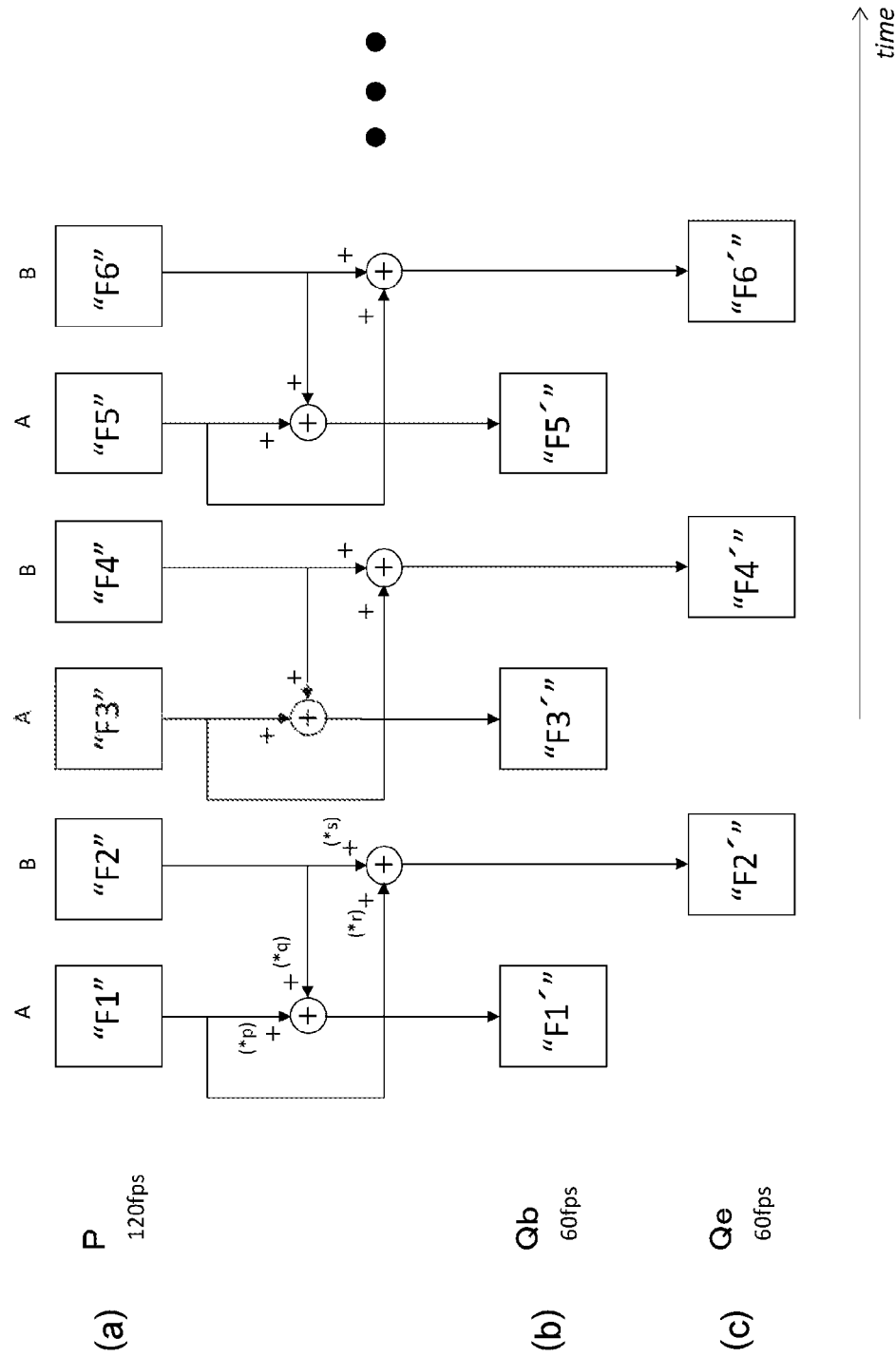
FIG. 6 is diagrams illustrating an exemplary relationship between input data (image data P) of the preprocessor and output data (image data Qb and Qe).

FIG. 6 schematically illustrates an exemplary relationship between the input data (120 fps-image data P) of the preprocessor 101 and the 60 fps-image data Qb (mix output C), and Qe (mix output D) generated in the preprocessor 101. FIG. 6(*a*) illustrates the image data P, FIG. 6(*b*) illustrates the image data Qb, and FIG. 6(*c*) illustrates the image data Qe. The image data F1', F3', F5', . . . of the respective pictures of the basic-frame-rate (60 fps) image data Qb and the image data F2', F4', F6', . . . of the respective pictures of the high-frame-rate image data Qe of the extended frame are obtained corresponding to the image data F1, F2, F3, F4, F5, F6, F7, F8, . . . of the respective pictures of the 120 fps-image data P.

Returning to FIG. 4, the encoder 102 performs the encoding processing on the image data Qb and Qe obtained in the preprocessor 101 to generate the basic stream STb and the extended stream STe. In this case, a predictive encoding processing such as H.246/AVC or H.265/HEVC is performed on the image data Qb and Qe.

The encoder 102 inserts the mixing ratio information in the mixing processing into the layers of the basic stream STb and the extended stream STe. In this case, the mixing ratio information regarding the first ratio (the coefficients p and q) is inserted into the layer of the basic stream STb and the mixing ratio information regarding the second ratio (the coefficients r and s) is inserted into the layer of the extended stream STe (see FIG. 5(*a*) and FIG. 6). The reception side can easily recognize at which mixing ratio the basic-frame-rate image data or the high-frame-rate image data of the extended frame is mixed.

According to the embodiment, the SEI NAL unit having the mixing ratio information is inserted into each access unit of the basic stream STb and the extended stream STe. In this case, the encoder 102 inserts a newly-defined inverse blending layer prediction SEI (inverse_blending_layer_prediction_SEI) into the part "SEIs" in the access unit (AU).

FIG. 7(*a*) illustrates an exemplary structure (Syntax) of the inverse blending layer prediction SEI, and FIG. 7(*b*) illustrates contents (Semantics) of main information in the exemplary structure. A 4-bit field in "blend_coef_alpha" indicates the coefficient α. A 4-bit field in "blend_coef_beta" indicates the coefficient β. The coefficients α and β correspond to the coefficients p and q in the inverse blending layer prediction SEI inserted into the basic stream STb, and correspond to the coefficients r and s in the inverse blending layer prediction SEI inserted into the extended stream STe.

Returning to FIG. 4, the multiplexer 103 performs packetized elementary stream (PES) packetization on the basic stream STb and the extended stream STe generated in the encoder 102, and further performs transport packetization to multiplex them, thereby obtaining the transport stream TS as multiplexed stream.

Further, the multiplexer 103 inserts the identification information indicating that the image data included in the basic stream is obtained by performing the mixing processing into the layer of the transport stream TS. In this case, the multiplexer 103 inserts a newly-defined video scalability information descriptor (video_scalability_information_descriptor) into the video elementary stream loop arranged corresponding to the extended stream under the program map table.

FIG. 8(*a*) illustrates an exemplary structure (Syntax) of the video scalability information descriptor. FIG. 8(*b*) illustrates contents (Semantics) of main information in the exemplary structure. An 8-bit field in "video_scalability_information_descriptor_tag" indicates a descriptor type, or the video scalability information descriptor herein. An 8-bit field in "video_scalability_information_descriptor_length" indicates a length (size) of the descriptor, or the number of subsequent bytes as a length of the descriptor.

A 1-bit field in "temporal_scalable_flag" is flag information regarding whether the stream is temporally scalable. For example, "1" indicates being temporally scalable, and "0" indicates not being temporally scalable. A 1-bit field in "picture_blending_for_base_stream_flag" is flag information regarding whether a picture mixing processing is performed on the basic stream. For example, "1" indicates that the mixing processing is performed, and "0" indicates that the mixing processing is not performed.

When "picture_blending_for_base_stream_flag" is "1", the 4-bit field in "blend_coef_alpha" and the 4-bit field in "blend_coef_beta" are present. The field in "blend_coef_alpha" indicates the coefficient α. The field in "blend_coef_beta" indicates the coefficient β.

Figure 9:
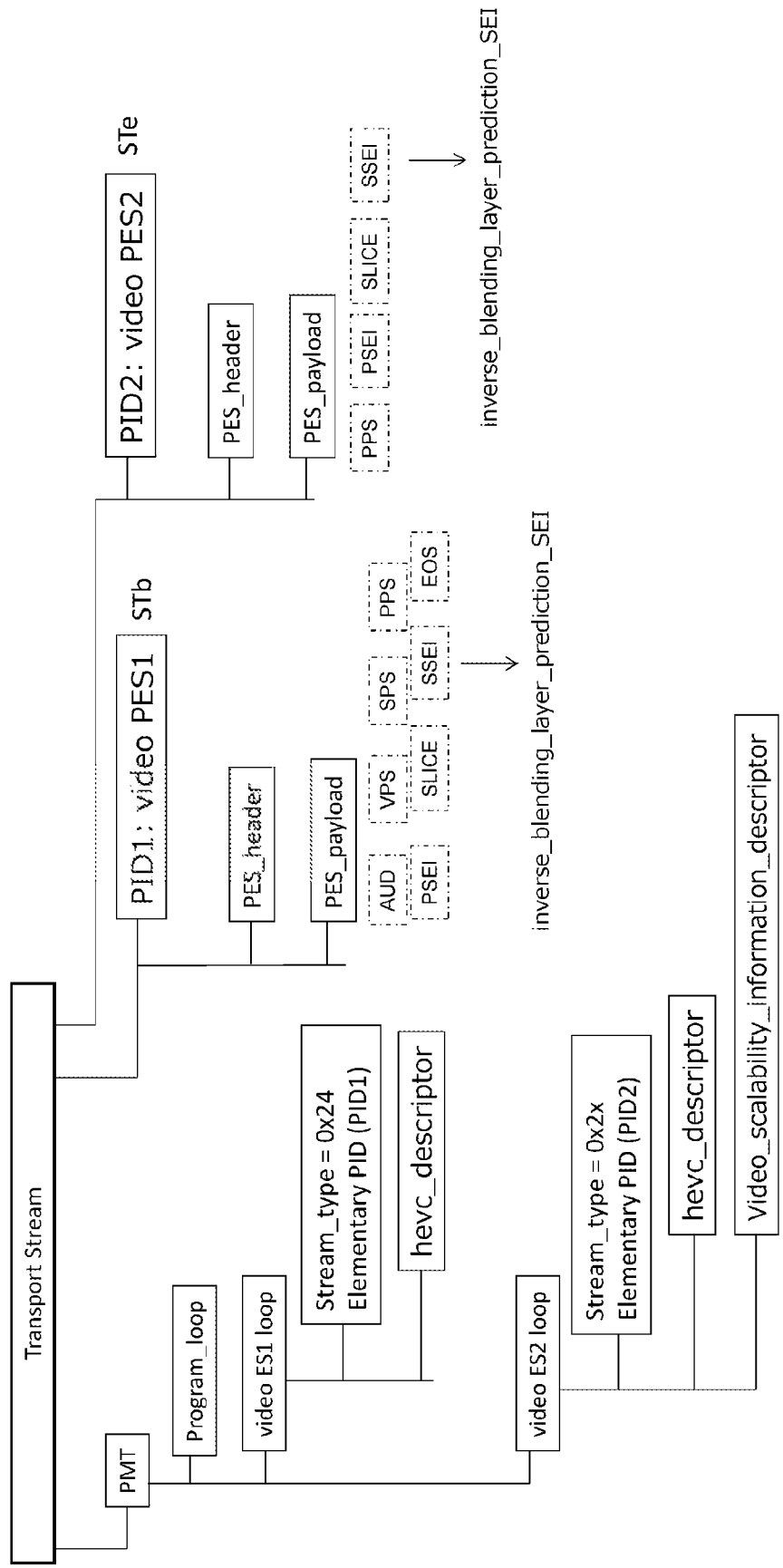
FIG. 9 is a diagram illustrating an exemplary configuration of a transport stream TS.

FIG. 9 illustrates an exemplary configuration of the transport stream TS. The transport stream TS includes two video streams of basic stream (base stream) STb and extended stream (enhance stream) STe. That is, in the exemplary configuration, a PES packet "video PES1" of the basic stream STb is present and a PES packet "video PES2" of the extended stream STe is present.

The inverse blending layer prediction SEI (see FIG. 7(a)) is inserted into the encoded image data of each picture contained in the PES packet "video PES1" and the PES packet "video PES2".

Further, the transport stream TS includes a program map table (PMT) as one piece of program specific information (PSI). The PSI is information describing which program each elementary stream included in the transport stream belongs to.

A program loop describing the information associated with the entire program is present in the PMT. Further, an elementary stream loop having the information associated with each video stream is present in the PMT. With the exemplary configuration, a video elementary stream loop "video ES1 loop" corresponding to the basic stream is present, and a video elementary stream loop "video ES2 loop" corresponding to the extended stream is present.

The information regarding stream type, packet identifier (PID) and the like is arranged and the descriptor describing the information associated with the video stream is also arranged in "video ES1 loop" corresponding to the basic stream (video PES1). The stream type is assumed as "0×24" indicating the basic stream.

Further, the information regarding stream type, packet identifier (PID), and the like is arranged and the descriptor describing the information associated with the video stream is also arranged in "video ES2 loop" corresponding to the extended stream (video PES2). The stream type is assumed as "0×2x" indicating the extended stream. Further, the video scalability information descriptor (see FIG. 8(a)) is inserted as one descriptor.

Returning to FIG. 4, the transmission unit 104 modulates the transport stream TS in a modulation system suitable for broadcast such as QPSK/OFDM, and transmits a RF modulation signal from a transmission antenna.

The operations of the transmission device 100 illustrated in FIG. 4 will be briefly described. The 120 fps-image data P is input into the preprocessor 101. The basic-frame-rate image data Qb and the high-frame-rate image data Qe of the extended frame are then output from the preprocessor 101.

Here, the preprocessor 101 performs the first ratio mixing processing on two temporally-consecutive pictures in the 120 fps-image data P to obtain the basic-frame-rate image data Qb (60 fps). Further, the preprocessor 101 performs the second ratio mixing processing on the two temporally-consecutive pictures to obtain the high-frame-rate image data Qe (60 fps) of the extended frame.

The image data Qb and Qe obtained in the preprocessor 101 are supplied to the encoder 102. The encoder 102 performs the encoding processing on the image data Qb and Qe to generate the basic stream STb and the extended stream STe. The mixing ratio information in the mixing processing is inserted into the layers of the basic stream STb and the extended stream STe by the encoder 102. In this case, the mixing ratio information regarding the first ratio (the coefficients p and q) is inserted into the layer of the basic stream STb and the mixing ratio information regarding the second ratio (the coefficients r and s) is inserted into the layer of the extended stream STe (see FIG. 5(a) and FIG. 6).

Specifically, the inverse blending layer prediction SEI (see FIG. 7(a)) is inserted into the part "SEIs" in each access unit of the basic stream STb and the extended stream STe.

The basic stream STb and the extended stream STe generated in the encoder 102 are supplied to the multiplexer 103. The basic stream STb and the extended stream STe are subjected to PES packetization and further transport packetization to be multiplexed by the multiplexer 103, thereby obtaining the transport stream TS as multiplexed stream.

Further, the identification information indicating that the image data included in the basic stream STb is obtained by performing the mixing processing is inserted into the layer of the transport stream TS by the multiplexer 103.

Specifically, the video scalability information descriptor (see FIG. 8(a)) is inserted into the video elementary stream loop arranged corresponding to the extended stream STe under the program map table.

The transport stream TS generated in the multiplexer 103 is sent to the transmission unit 104. The transport stream TS is modulated in a modulation system suitable for broadcast such as QPSK/OFDM in the transmission unit 104 and a RF modulation signal is transmitted from the transmission antenna.

[Configuration of Reception Device]

Figure 10:
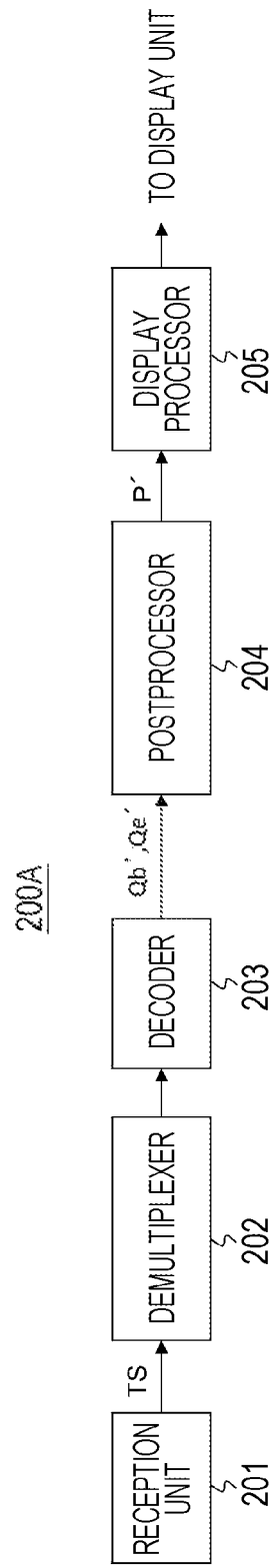
FIG. 10 is a block diagram illustrating an exemplary configuration of the reception device (for high frame rate).

FIG. 10 illustrates an exemplary configuration of the reception device 200A having a decoding capability of processing 120 fps-moving image data. The reception device 200A includes a reception unit 201, a demultiplexer 202, the decoder 203, the postprocessor 204, and a display processor 205.

The reception unit 201 demodulates the RF modulation signal received by a reception antenna to obtain the transport stream TS. The demultiplexer 202 takes out the basic stream STb and the extended stream STe from the transport stream TS by PID filtering, and supplies them to the decoder 203.

Further, the demultiplexer 202 extracts section information included in the layer of the transport stream TS and sends it to a control unit (not illustrated). In this case, the video scalability information descriptor (see FIG. 8(a)) is also extracted. Thereby, the control unit recognizes that the image data included in the basic stream STb is obtained by performing the mixing processing, and the like.

The decoder 203 performs the decoding processing on the basic stream STb to obtain the basic-frame-rate image data Qb', and performs the decoding processing on the extended stream STe to obtain the high-frame-rate image data Qe' of the extended frame.

Here, the image data Qb' is obtained by performing the encoding processing and then the decoding processing on the image data obtained by performing the first ratio mixing processing on two temporally-consecutive pictures in the 120 fps-image data P. Further, the image data Qe' is obtained by performing the encoding processing and then the decoding processing on the image data obtained by performing the second ratio mixing processing on the two temporally-consecutive pictures.

Moreover, the decoder 203 extracts a parameter set or SEI inserted in each access unit configuring the basic stream STb and the extended stream STe, and sends it to the control unit (not illustrated). In this case, the inverse blending layer prediction SEI (see FIG. 7(a)) having the mixing ratio information is also extracted. Thereby, the control unit can easily recognize at which mixing ratio the basic-frame-rate image data or the high-frame-rate image data of the extended frame is mixed.

The postprocessor 204 processes the basic-frame-rate image data Qb' and the high-frame-rate image data Qe' of the extended frame obtained by the decoder 203 to obtain the 120 fps-image data P'.

Figure 11:
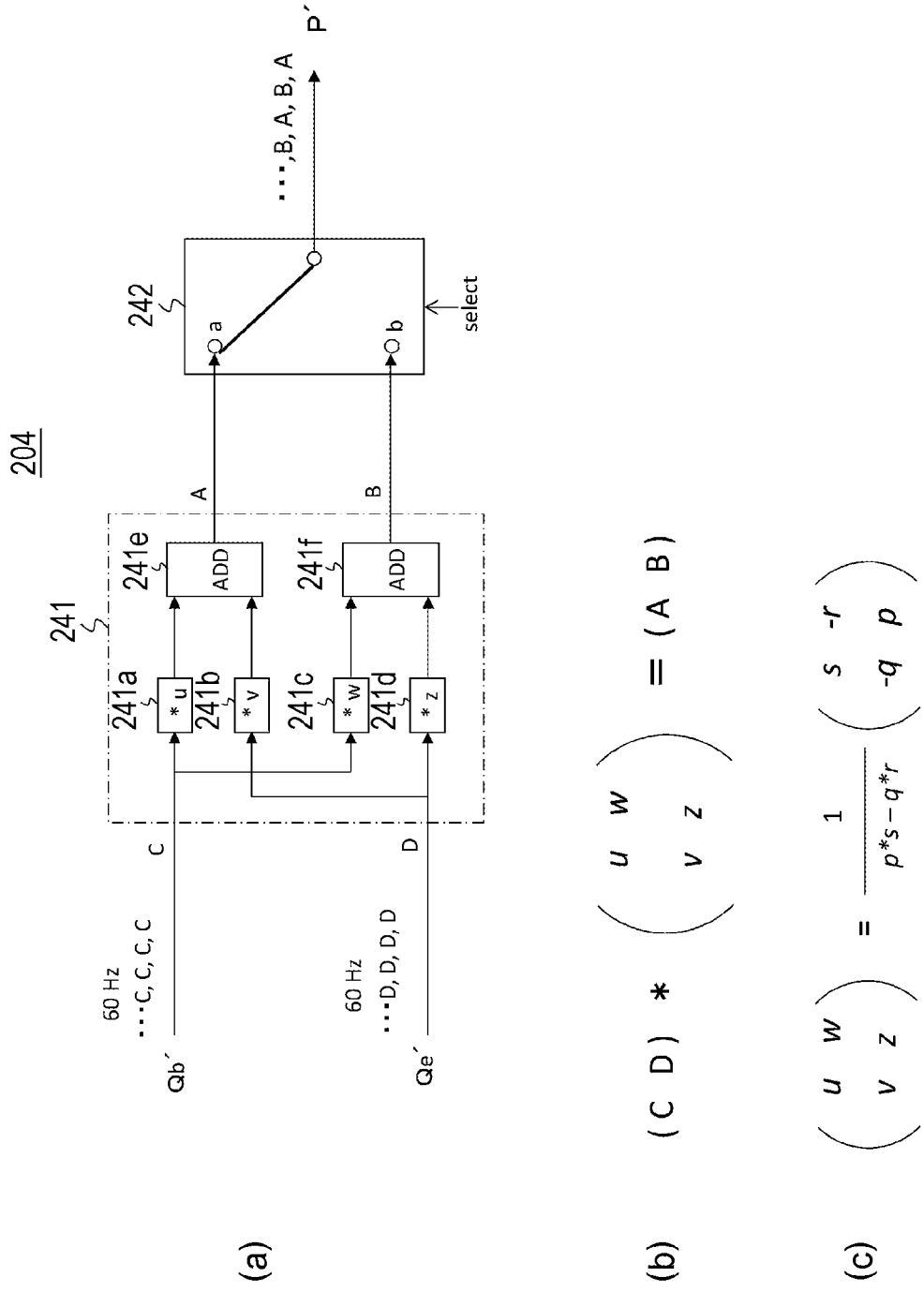
FIG. 11 is a block diagram illustrating an exemplary configuration of a postprocessor.

FIG. 11(a) illustrates an exemplary configuration of the postprocessor 204. The postprocessor 204 includes a calculation circuit 241 and a switch circuit 242. Further, the calculation circuit 241 includes coefficient multiplication units 241a, 241b, 241c, and 241d and addition units 241e and 241f. The calculation circuit 241 performs a reverse processing to the mixing processing (reverse mixing processing) in the calculation circuit 112 in the preprocessor 101 in FIG. 5(a).

The coefficient multiplication units 241a and 241b and the addition unit 241e are used for obtaining image data of a first picture in the two temporally-consecutive pictures from the image data Qb' and the image data Qe'. A coefficient u is multiplied by the coefficient multiplication unit 241a and a coefficient v is multiplied by the coefficient multiplication unit 241b. Further, the coefficient multiplication units 241c and 241d and the addition unit 241f are used for obtaining image data of a second picture in the two temporally-consecutive pictures from the image data Qb' and the image data Qe'. A coefficient w is multiplied by the coefficient multiplication unit 241c and a coefficient z is multiplied by the coefficient multiplication unit 241d.

The basic-frame-rate image data Qb is input into the coefficient multiplication units 241a and 241c configuring the calculation circuit unit 241. Further, the high-frame-rate image data Qe' of the extended frame is input into the coefficient multiplication units 241b and 241d configuring the calculation circuit 241. The outputs of the coefficient multiplication units 241a and 241b are input into and added in the addition unit 241e. Further, the outputs of the coefficient multiplication units 241c and 241d are input into and added in the addition unit 241f.

In this case, the image data A of the first picture in the two temporally-consecutive pictures is obtained as the output of the addition unit 241e and the image data B of the second picture in the two temporally-consecutive pictures is obtained as the output of the addition unit 241f. FIG. 11(b) illustrates the calculation for the reverse mixing processing in the calculation circuit 241 in a mathematical equation. Further, FIG. 11(c) illustrates a correspondence between the coefficients u, v, w, and z and the coefficients p, q, r, and s in a matrix.

The outputs of the addition units 241e and 241f in the calculation circuit 241 are input into the fixed terminals on the side a and the side b of the switch circuit 242, respectively. The switch circuit 242 can alternately switch the side a and the side b at a cycle of 120 Hz. The 120 fps-image data P', in which the image data A and B are combined, is obtained from the switch circuit 242.

In a case where the 120 fps-image data P' is obtained by the postprocessor 204 illustrated in FIG. 11(a), the reverse processing to the mixing processing is performed, and thus the finally-obtained 120 fps-image data P' is reproduced in its original shutter aperture ratio, and image quality in high-frame-rate image display can be enhanced.

Figure 12:
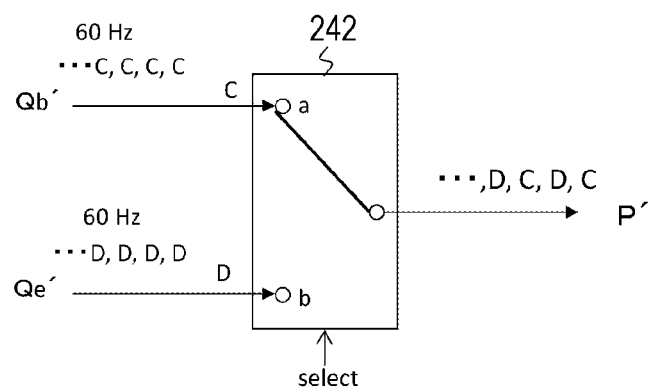
FIG. 12 is a block diagram illustrating other exemplary configuration of the postprocessor.

FIG. 12 illustrates other exemplary configuration of the postprocessor 204. The postprocessor 204 includes the switch circuit 242. The basic-frame-rate image data Qb' is input into the fixed terminal on the side a of the switch circuit 242. Further, the high-frame-rate image data Qe' of the extended frame is input into the fixed terminal on the side b of the switch circuit 242. The switch circuit 242 can alternately switch the side a and the side b at a cycle of 120 Hz. The 120 fps-image data P', in which the image data Qb' (C) and the image data Qe' (D) are combined, is obtained from the switch circuit 242.

In a case where the 120 fps-image data P' is obtained by the postprocessor 204 illustrated in FIG. 12, the calculation for performing the reverse processing to the mixing processing is not required, thereby easily obtaining high-frame-rate image data.

Returning to FIG. 10, the display processor 205 performs a temporally-directional interpolation processing or a frame interpolation processing on the high-frame-rate image data P' as needed, and obtains the image data of a higher frame rate than 120 fps and supplies it to a display unit.

The operations of the reception device 200A illustrated in FIG. 10 will be briefly described. The RF modulation signal received by the reception antenna is demodulated by the reception unit 201 to obtain the transport stream TS. The transport stream TS is sent to the demultiplexer 202. The basic stream STb and the extended stream STe are taken out from the transport stream TS by PID filtering and are supplied to the decoder 203 by the demultiplexer 202.

Further, the demultiplexer 202 extracts the section information included in the layer of the transport stream TS and sends it to the control unit (not illustrated). The video scalability information descriptor (see FIG. 8(a)) is also extracted. Thereby, the control unit recognizes that the image data included in the basic stream STb is obtained by performing the mixing processing, and the like.

The decoder 203 performs the decoding processing on the basic stream STb and the extended stream STe to obtain the basic-frame-rate image data Qb' and the high-frame-rate image data Qe' of the extended frame. Further, the decoder 203 extracts the parameter set or SEI inserted in each access unit configuring the basic stream STb and the extended stream STe and sends it to the control unit (not illustrated). Thereby, the control unit can easily recognize at which mixing ratio the basic-frame-rate image data Qb' or the high-frame-rate image data Qe' of the extended frame is mixed.

The basic-frame-rate image data Qb and the high-frame-rate image data Qe of the extended frame obtained by the decoder 203 are supplied to the postprocessor 204. The postprocessor 204 processes the image data Qb' and Qe' to obtain the 120 fps-image data P'.

The image data P' is supplied to the display processor 205. The display processor 205 performs the temporally-directional interpolation processing or the frame interpolation processing on the high-frame-rate image at a Qe' as needed to obtain image data of a higher frame rate than 120 fps. The image data is supplied to the display unit to display the image.

Figure 13:
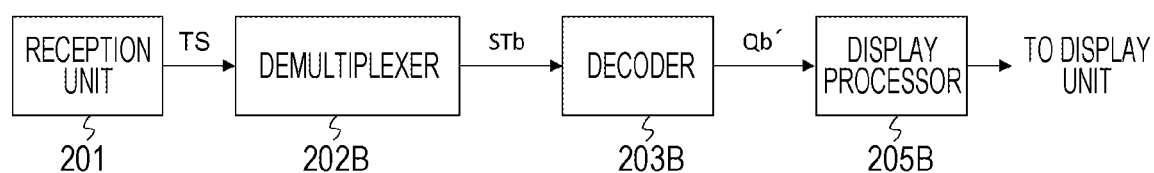
FIG. 13 is a block diagram illustrating an exemplary configuration of the reception device (for normal frame rate).

FIG. 13 illustrates an exemplary configuration of the reception device 200B having a decoding capability of processing 60 fps-moving image data. In FIG. 13, the same reference numerals are denoted to the parts corresponding to those in FIG. 10, and the detailed description thereof will be omitted as needed. The reception device 200B includes the reception unit 201, a demultiplexer 202B, a decoder 203B, and a display processor 205B.

The reception unit 201 demodulates the RF modulation signal received by the reception antennal to obtain the transport stream TS. The demultiplexer 202B extracts only the basic stream STb from the transport stream TS by PID filtering, and supplies it to the decoder 203B.

The decoder 203B performs the decoding processing on the basic stream STb to obtain the basic-frame-rate image data Qb'. Here, the image data Qb' is obtained by performing the encoding processing and then the decoding processing on the image data obtained by performing the first ratio mixing processing on two temporally-consecutive pictures in the 120 fps-image data P. The display processor 205B performs the temporally-directional interpolation processing or the frame interpolation processing on the 60 fps-image data Qb' to obtain image data of a higher frame rate than 60 fps. The image data is supplied to the display unit to display the image.

As described above, in the transmission/reception system 10 illustrated in FIG. 1, the basic stream STb, which is obtained by performing the first ratio mixing processing on two temporally-consecutive pictures in the 120 fps-image data P and which includes the image data Qb of a basic frame rate of 60 fps with a higher aperture ratio, is transmitted. Thus, for example, in a case where the reception side has the decoding capability of processing the basic-frame-rate image data, the basic stream STb is processed to obtain the basic-frame-rate image data, thereby displaying a smooth image as moving image and avoiding causing a problem of image quality in the frame interpolation processing with low-load calculation in the display processing.

Further, in the transmission/reception system 10 illustrated in FIG. 1, the extended stream STe, which includes the high-frame-rate image data Qe of the extended frame obtained by performing the second ratio mixing processing on the two temporally-consecutive pictures, is transmitted together with the basic stream STb. Thus, in a case of a receiver having the decoding capability of processing high-frame-rate image data, the extended stream is processed to obtain the high-frame-rate image data of the extended frame, and is combined with the basic-frame-rate image data to obtain the high-frame-rate image data, thereby preferably performing high-frame-rate image display.

2. Variant

Additionally, according to the embodiment, the preprocessor 101 in the transmission device 100 performs the first ratio mixing processing on two temporally-consecutive pictures in the 120 fps-image data P to obtain the basic-frame-rate image data Qb, and performs the second ratio mixing processing on the two temporally-consecutive pictures to obtain the high-frame-rate image data Qe of the extended frame (see FIG. 5(a) and FIG. 6).

However, the preprocessor 101 may perform the first ratio mixing processing on image data of a first frame and image data of a second frame subsequent to the first frame in 120 fps-image data P in which the first frame and the second frame are alternately consecutive to obtain the basic-frame-rate image data Qb, and may perform the second ratio mixing processing on the image data of the second frame and the image data of the first frame subsequent to the second frame in the 120 fps-image data P to obtain the high-frame-rate image data Qe of the extended frame.

Figure 14:
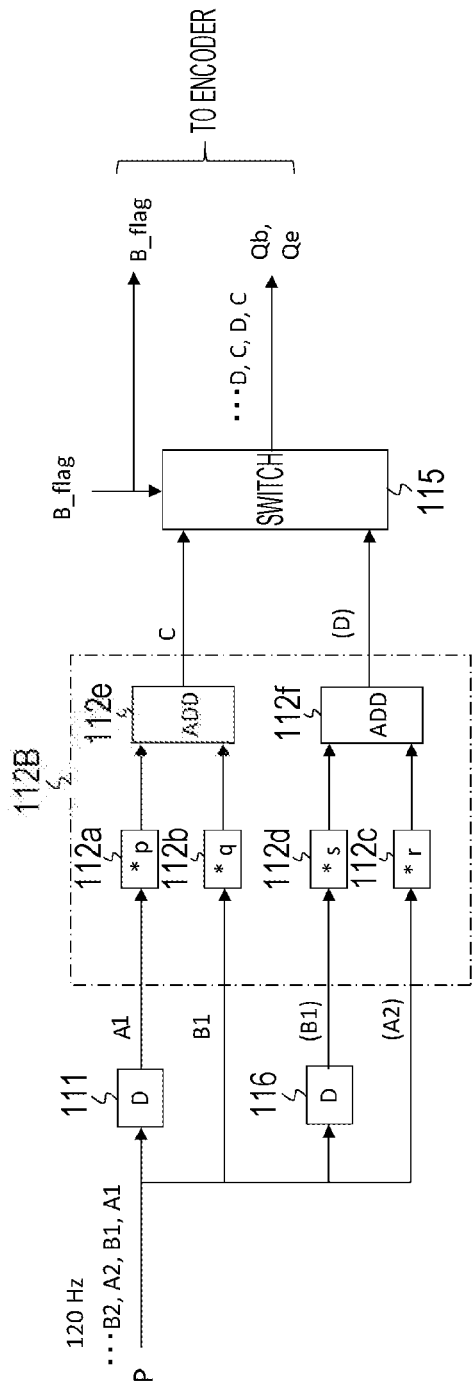
FIG. 14 is a block diagram illustrating other exemplary configuration of the preprocessor.

FIG. 14 illustrates an exemplary configuration of the preprocessor 101 in this case. In FIG. 14, the same or corresponding reference numerals are denoted to the parts corresponding to those in FIG. 5(a). The preprocessor 101 includes delay circuits 111 and 116 for delaying by one frame of 120 fps, a calculation circuit 112B, and the switch circuit 115. Further, the calculation circuit 112B includes the coefficient multiplication units 112a, 112b, 112c, and 112d and the addition units 112e and 112f.

The coefficient multiplication units 112a and 112b and the addition unit 112e are used for performing the first ratio mixing processing on image data of a first frame (A) and image data of a second frame (B) subsequent to the first frame (A) in 120 fps-image data P in which the first frame (A) and the second frame (B) are alternately consecutive.

Further, the coefficient multiplication units 112c and 112d and the addition unit 112f are used for performing the second ratio mixing processing on the image data of the second frame (B) and the image data of the first frame (A) subsequent to the second frame (B) in the 120 fps-image data P.

The 120 fps-image data P is delayed by one frame in the delay circuit 111, and then input into the coefficient multiplication unit 112a configuring the calculation circuit 112B and input into the coefficient multiplication unit 112b as it is. Further, the 120 fps-image data P is delayed by one frame in the delay circuit 116, and then input into the coefficient multiplication unit 112d configuring the calculation circuit 112B and input into the coefficient multiplication unit 112c as it is. The outputs of the coefficient multiplication units 112a and 112b are input into and added in the addition unit 112e. Further, the outputs of the coefficient multiplication units 112c and 112d are input into and added in the addition unit 112f.

The mix output of C (=p*A+q*B) is obtained as the output of the addition unit 112e at a timing when the output of the delay circuit 111 is the first frame (A). Further, the mix output of D (=r*A+s*B) is obtained as the output of the addition unit 112f at a timing when the output of the delay circuit 116 is the second frame (B). The output C of the addition units 112e and 112f in the calculation circuit 112B is input into the switch circuit 115 as it is.

The switch circuit 115 is supplied with the flag signal B_flag as a switch control signal. The flag signal B_flag alternately takes "1" or "0" at a cycle of 120 Hz, takes "1" at a timing when the output of the addition unit 112e is the mix output C, and takes "0" at a timing when the output of the addition unit 112f is the mix output D.

The switch circuit 115 takes out the mix output C as the output of the addition unit 112e when the f lag signal B_flag takes "1", and takes out the mix output D as the output of the addition unit 112f when the flag signal B_flag takes "0". Here, the mix output C configures the basic-frame-rate image data Qb obtained by performing the first ratio mixing processing on the image data of the first frame (A) and the image data of the second frame (B) subsequent to the first frame (A) in the image data P. Further, the mix output D configures the high-frame-rate image data Qe of the extended frame obtained by performing the second ratio mixing processing on the image data of the second frame (B) and the image data of the first frame (A) subsequent to the second frame (B) in the image data P.

The image data Qb and Qe are output as one system of image data from the switch circuit 115 and sent to the encoder 102. Here, the system of image data is added with the flag signal B_flag, and is sent. The flag signal B_flag enables the encoder 102 to identify whether a current frame (picture) of the image data sent in one system is a frame of the image data Qb or a frame of the image data Qe.

FIG. 15 schematically illustrates an exemplary relationship between the input data (120 fps-image data P) of the preprocessor 101 and the 60 fps-image data Qb (mix output C), and Qe (mix output D) generated in the preprocessor 101. FIG. 15(a) illustrates the image data P, FIG. 15(b) illustrates the image data Qb, and FIG. 15(c) illustrates the image data Qe. The image data F1', F3', F5', . . . of the respective pictures in the basic-frame-rate (60 fps) image data Qb and the image data F2', F4', F6', . . . of the respective pictures in the high-frame-rate image data Qe of the extended frame are obtained corresponding to the image data F1, F2, F3, F4, F5, F6, F7, F8, . . . of the respective pictures in the 120 fps-image data P.

As described above, when the basic-frame-rate image data Qb is obtained by performing the mixing processing on the image data of the first frame and the image data of the second frame subsequent to the first frame, and the high-frame-rate image data Qe of the extended frame is obtained by performing the second ratio mixing processing on the image data of the second frame and the image data of the first frame subsequent to the second frame, the reception side can smoothly perform high-frame-rate image display with excellent frame continuity of the 120 fps-image data P' obtained in the postprocessor 204 illustrated in FIG. 12, for example.

Further, an entire frame rate of 120 fps and a basic frame rate of 60 fps are described by way of example according to the embodiment, but a combination of frame rates is not limited thereto. For example, a combination of 100 fps and 50 fps is similarly possible.

Further, the transmission/reception system 10 including the transmission device 100 and the reception device 200 is described according to the embodiment, but a configuration of a transmission/reception system to which the present technology is applicable is not limited thereto. For example, the reception device 200 may be replaced with a set top box and a monitor connected in a digital interface such as high-definition multimedia interface (HDMI). Additionally, "HDMI" is a registered trademark.

Further, a container is assumed as a transport stream (MPEG-2 TS) according to the above embodiment. However, the present technology is similarly applicable to systems in which distribution is made to reception terminals by use of a network such as the Internet. The Internet distribution uses a container in MP4 or other format in many cases. That is, a container takes various formats such as transport stream (MPEG-2 TS) or MPEG media transport (MMT) employed in a digital broadcast standard, or ISOBMFF (MP4) used in the Internet distribution.

Further, the present technology can adopt the following configurations.

(1) A transmission device including:

an image processing unit that performs a first ratio mixing processing on two temporally-consecutive pictures in high-frame-rate image data to obtain basic-frame-rate image data, and performs a second ratio mixing processing on the two temporally-consecutive pictures to obtain high-frame-rate image data of an extended frame;

an image encoding unit that performs an encoding processing on the reference-frame-rate image data to obtain a basic stream and performs an encoding processing on the high-frame-rate image data of the extended frame to obtain an extended stream; and a transmission unit that transmits a container including the basic stream and the extended stream in a predetermined format.

(2) The transmission device according to (1), in which the image processing unit supplies the image encoding unit with the basic-frame-rate image data and the high-frame-rate image data of the extended frame as one system of image data, and the system of image data is added with identification information for identifying the respective frames of the basic-frame-rate image data and the high-frame-rate image data of the extended frame.

(3) The transmission device according to (1) or (2), further including:

an information insertion unit for one of or both inserting mixing ratio information regarding the first ratio into a layer of the basic stream and inserting mixing ratio information regarding the second ratio into a layer of the extended stream.

(4) The transmission device according to (3), in which the basic stream and the extended stream have a NAL unit structure, and the information insertion unit inserts a SEI NAL unit having the mixing ratio information into the basic stream and/or the extended stream.

(5) The transmission device according to any one of (1) to (4), further including:

an information insertion unit that inserts identification information indicating that image data included in the basic stream is obtained by performing the mixing processing into a layer of the container.

(6) A transmission method including:

an image processing step of performing a first ratio mixing processing on two temporally-consecutive pictures in high-frame-rate image data to obtain basic-frame-rate image data, and performing a second ratio mixing processing on the two temporally-consecutive pictures to obtain high-frame-rate image data of an extended frame;

an image encoding step of performing an encoding processing on the reference-frame-rate image data to obtain a basic stream and performs an encoding processing on the high-frame-rate image data of the extended frame to obtain an extended stream; and a transmission step of transmitting a container including the basic stream and the extended stream in a predetermined format by a transmission unit.

(7) A reception device including:

a reception unit that receives a container including a basic stream and an extended stream in a predetermined format, in which the basic stream is obtained by performing an encoding processing on basic-frame-rate image data obtained by performing a first ratio mixing processing on two temporally-consecutive pictures in high-frame-rate image data, and the extended stream is obtained by performing an encoding processing on high-frame-rate image data of an extended frame obtained by performing a second ratio mixing processing on the two temporally-consecutive pictures, the reception device further including a processing unit that processes only the basic stream to obtain the basic-frame-rate image data or processes both the basic stream and the extended stream to obtain the high-frame-rate image data.

(8) The reception device according to (7), in which in order to obtain the high-frame-rate image data, the processing unit performs a processing of performing a decoding processing on the basic stream to obtain the basic-frame-rate image data and performing a decoding processing on the extended stream to obtain the high-frame-rate image data of the extended frame, and a processing of combining the basic-frame-rate image data with the high-frame-rate image data of the extended frame to obtain the high-frame-rate image data.

(9) The reception device according to (7), in which in order to obtain the high-frame-rate image data, the processing unit performs a processing of performing a decoding processing on the basic stream to obtain the basic-frame-rate image data and performing a decoding processing on the extended stream to obtain the high-frame-rate image data of the extended frame, a processing of performing a reverse processing to the mixing processing on the basic-frame-rate image data and the high-frame-rate image data of the extended frame to obtain image data of one and the other pictures in the two temporally-consecutive pictures, and a processing of combining the image data of one and the other pictures in the two temporally-consecutive pictures to obtain the high-frame-rate image data.

(10) A reception method including:

a reception step of receiving a container including a basic stream and an extended stream in a predetermined format by a reception unit, in which the basic stream is obtained by performing an encoding processing on basic-frame-rate image data obtained by performing a first ratio mixing processing on two temporally-consecutive pictures in high-frame-rate image data, and the extended stream is obtained by performing an encoding processing on high-frame-rate image data of an extended frame obtained by performing a second ratio mixing processing on the two temporally-consecutive pictures, the reception method further including a processing step of processing only the basic stream to obtain the basic-frame-rate image data or processing both the basic stream and the extended stream to obtain the high-frame-rate image data.

(11) A transmission device including:

an image processing unit that performs a first ratio mixing processing on image data of a first frame and image data of a second frame subsequent to the first frame in high-frame-rate image data in which the first frame and the second frame are alternately consecutive to obtain basic-frame-rate image data, and performs a second ratio mixing processing on the image data of the second frame and the image data of the first frame subsequent to the second frame to obtain high-frame-rate image data of an extended frame;

an image encoding unit that performs an encoding processing on the reference-frame-rate image data to obtain a basic stream, and performs an encoding processing on the high-frame-rate image data of the extended frame to obtain an extended stream; and a transmission unit that transmits a container including the basic stream and the extended stream in a predetermined format.

(12) The transmission device according to (11), in which the image processing unit supplies the image encoding unit with the basic-frame-rate image data and the high-frame-rate image data of the extended frame as one system of image data, and the system of image data is added with identification information for identifying the respective frames of the basic-frame-rate image data and the high-frame-rate image data of the extended frame.

(13) The transmission device according to (11) or (12), further including:

an information insertion unit for one of or both inserting mixing ratio information regarding the first ratio into a layer of the basic stream and inserting mixing ratio information regarding the second ratio into a layer of the extended stream.

(14) The transmission device according to (13), in which the basic stream and the extended stream have a NAL unit structure, and the information insertion unit inserts a SEI NAL unit having the mixing ratio information into the basic stream and/or the extended stream.

(15) The transmission device according to any one of (11) to (14), further including:

an information insertion unit that inserts identification information indicating that image data included in the basic stream is obtained by performing the mixing processing into a layer of the container.

(16) A transmission method including:

an image processing step of performing a first ratio mixing processing on image data of a first frame and image data of a second frame subsequent to the first frame in high-frame-rate image data in which the first frame and the second frame are alternately consecutive to obtain basic-frame-rate image data, and performing a second ratio mixing processing on the image data of the second frame and the image data of the first frame subsequent to the second frame to obtain high-frame-rate image data of an extended frame;

an image encoding step of performing an encoding processing on the reference-frame-rate image data to obtain a basic stream, and performing an encoding processing on the high-frame-rate image data of the extended frame to obtain an extended stream; and a transmission step of transmitting a container including the basic stream and the extended stream in a predetermined format by a transmission unit.

(17) A reception device including:

a reception unit that receives a container including a basic stream and an extended stream in a predetermined format, in which the basic stream is obtained by performing an encoding processing on basic-frame-rate image data obtained by performing a first ratio mixing processing on image data of a first frame and image data of a second frame subsequent to the first frame in high-frame-rate image data in which the first frame and the second frame are alternately consecutive, and the extended stream is obtained by performing an encoding processing on high-frame-rate image data of an extended frame obtained by performing a second ratio mixing processing on the image data of the second frame and the image data of the first frame subsequent to the second frame in the high-frame-rate image data, the reception device further including a processing unit that processes only the basic stream to obtain the basic-frame-rate image data or processes both the basic stream and the extended stream to obtain the high-frame-rate image data.

(18) The reception device according to (17), in which in order to obtain the high-frame-rate image data, the processing unit performs a processing of performing a decoding processing on the basic stream to obtain the basic-frame-rate image data and performing a decoding processing on the extended stream to obtain the high-frame-rate image data of the extended frame, and a processing of combining the basic-frame-rate image data with the high-frame-rate image data of the extended frame to obtain the high-frame-rate image data.

(19) A reception method including:

a reception step of receiving a container including a basic stream and an extended stream in a predetermined format by a reception unit, in which the basic stream is obtained by performing an encoding processing on basic-frame-rate image data obtained by performing a first ratio mixing processing on image data of a first frame and image data of a second frame subsequent to the first frame in high-frame-rate image data in which the first frame and the second frame are alternately consecutive, and the extended stream is obtained by performing an encoding processing on high-frame-rate image data of an extended frame obtained by performing a second ratio mixing processing on the image data of the second frame and the image data of the first frame subsequent to the second frame in the high-frame-rate image data, the reception method further including a processing step of processing only the basic stream to obtain the basic-frame-rate image data or processing both the basic stream and the extended stream to obtain the high-frame-rate image data.

A main characteristic of the present technology lies in that the first ratio mixing processing is performed on two temporally-consecutive pictures in the 120 fps-image data P to obtain the image data Qb of a basic frame rate of 60 fps and the second ratio mixing processing is performed on the two temporally-consecutive pictures to obtain the image data Qe of a high frame rate of 60 fps of the extended frame, or the first ratio mixing processing is performed on image data of a first frame and image data of a second frame subsequent to the first frame in the 120 fps-image data P in which the first frame and the second frame are alternately consecutive to obtain the basic-frame-rate image data Qb and the second ratio mixing processing is performed on the image data of the second frame and the image data of the first frame subsequent to the second frame in the 120 fps-image data P to obtain the high-frame-rate image data Qe of the extended frame, and the extended stream STe including the image data Qe is transmitted together with the basic stream STb including the image data Qb, thereby preferably transmitting high-frame-rate image data while achieving backward compatibility (see FIGS. 3, 6, and 15).

REFERENCE SIGNS LIST

10 Transmission/reception system
100 Transmission device
101 Preprocessor
102 Encoder
103 Multiplexer
104 Transmission unit
111, 114, 116 Delay circuit
112, 112B Calculation circuit
112a to 112d Coefficient multiplication unit
112e, 112f Addition unit
115 Switch circuit
200, 200A, 200B Reception device
201 Reception unit
202, 202B Demultiplexer
203, 203B Decoder
204 Postprocessor
205, 205B Display processor
241 Calculation circuit
241a to 241d Coefficient multiplication unit
241e, 241f Addition unit
242 Switch circuit

The invention claimed is:

1. A transmission device, comprising circuitry configured to:
   perform a first mixing process on two temporally-consecutive first pictures in high-frame-rate image data to obtain basic image data, a first mixing ratio of the first mixing process being p to q, p and q being numbers, p being greater than or equal to 0 and smaller than or equal to 1, a sum of p and q being equal to 1, and a second mixing process on two temporally-consecutive second pictures in the high-frame-rate image data to obtain extended image data, a second mixing ratio of the second mixing process being r to s, r and s being numbers, r being greater than or equal to 0 and smaller than or equal to 1, a sum of r and s being equal to 1;
   perform an encoding process to encode the basic image data to obtain basic encoded image data, and to encode the extended image data to obtain extended encoded image data; and
   transmit the basic encoded image data, the extended encoded image data, and mixing ratio information indicating the first mixing ratio.

2. The transmission device according to claim 1, wherein the first mixing ratio is different from the second mixing ratio.

3. The transmission device according to claim 1, wherein the two temporally-consecutive first pictures include at least one of the two temporally-consecutive second pictures.

4. The transmission device according to claim 1, wherein the two temporally-consecutive first pictures are the same two pictures of the two temporally-consecutive second pictures.

5. The transmission device according to claim 1, wherein the circuitry is configured to transmit a container including the basic encoded image data, the extended encoded image data, and the mixing ratio information, and the container has a format of MPEG-2 Transport Stream (MPEG-2 TS), MPEG Media Transport (MMT) or ISO Base Media File Format (ISO BMFF).

6. A reception device, comprising:
   a receiver configured to:
      receive basic encoded image data which is obtained by encoding basic image data, and extended encoded image data which is obtained by encoding extended image data, wherein the basic image data is obtained by performing a first mixing process on two temporally-consecutive first pictures in high-frame-rate image data, a first mixing ratio of the first mixing process being p to q, p and q being numbers, p being greater than or equal to 0 and smaller than or equal to 1, a sum of p and q being equal to 1, and the extended image data is obtained by performing a second mixing process on two temporally-consecutive second pictures in the high-frame-rate image data, a second mixing ratio of the second mixing process being r to s, r and s being numbers, r being greater than or equal to 0 and smaller than or equal to 1, a sum of r and s being equal to 1; and
      receive mixing ratio information indicating the first mixing ratio; and
   circuitry configured to:
      decode the basic encoded image data to obtain decoded basic image data;
      decode the extended encoded image data to obtain decoded extended image data; and
      perform a reverse mixing process with the decoded basic image data, the decoded extended image data, and the mixing ratio information to obtain the high-frame-rate image data.

7. The reception device according to claim 6, wherein the reverse mixing process is performed according to:

$$[A\ B] = [C\ D] * \frac{1}{p*s - q*r} \begin{bmatrix} s & -r \\ -q & p \end{bmatrix},$$

where A and B represent the image data of the two temporally-consecutive pictures, respectively, C and D represent the decoded basic image data and the decoded extended image data, respectively.

8. The reception device according to claim 6, wherein the two temporally-consecutive first pictures in the high-frame-rate image data are the same two pictures of the two temporally-consecutive second pictures in the high-frame-rate image data.

9. The reception device according to claim 6, wherein the circuitry is further configured to perform interpolation processing on the high-frame-rate image data to obtain image data having a higher frame rate than the high-frame-rate image data.

10. The reception device according to claim 6, wherein the basic encoded image data, the extended encoded image data, and the mixing ratio information are included in a container, and the container has a format of MPEG-2 Transport Stream (MPEG-2 TS), MPEG Media Transport (MMT) or ISO Base Media File Format (ISO BMFF).

11. The reception device according to claim 6, further comprising:
a display to display the high-frame-rate image data.

12. A reception method, comprising:
receiving, by a receiver of a reception device, basic encoded image data which is obtained by encoding basic image data, and extended encoded image data which is obtained by encoding extended image data, wherein the basic image data is obtained by performing a first mixing process on two temporally-consecutive first pictures in high-frame-rate image data, a first mixing ratio of the first mixing process being p to q, p and q being numbers, p being greater than or equal to 0 and smaller than or equal to 1, a sum of p and q being equal to 1, and the extended image data is obtained by performing a second mixing process on two temporally-consecutive second pictures in the high-frame-rate image data, a second mixing ratio of the second mixing process being r to s, r and s being numbers, r being greater than or equal to 0 and smaller than or equal to 1, a sum of r and s being equal to 1;
receiving, by the receiver of the reception device, mixing ratio information indicating the first mixing ratio;

decoding, by circuitry of the reception device, the basic encoded image data to obtain decoded basic image data;
decoding, by the circuitry of the reception device, the extended encoded image data to obtain decoded extended image data; and
performing, by the circuitry of the reception device, a reverse mixing process with the decoded basic image data, the decoded extended image data, and the mixing ratio information to obtain the high-frame-rate image data.

13. The reception method according to claim 12, wherein the reverse mixing process is performed according to:

$$[A\ B] = [C\ D] * \frac{1}{p*s - q*r} \begin{bmatrix} s & -r \\ -q & p \end{bmatrix},$$

where A and B represent the image data of the two temporally-consecutive pictures, respectively, C and D represent the decoded basic image data and the decoded extended image data, respectively.

14. The reception method according to claim 12, wherein the two temporally-consecutive first pictures in the high-frame-rate image data are the same two pictures of the two temporally-consecutive second pictures in the high-frame-rate image data.

15. The reception method according to claim 12, further comprising:
performing, by the circuitry of the reception device, interpolation processing on the high-frame-rate image data to obtain image data having a higher frame rate than the high-frame-rate image data.

16. The reception method according to claim 12, wherein the basic encoded image data, the extended encoded image data, and the mixing ratio information are included in a container, and the container has a format of MPEG-2 Transport Stream (MPEG-2 TS), MPEG Media Transport (MMT) or ISO Base Media File Format (ISO BMFF).

* * * * *